(12) United States Patent
Zhang et al.

(10) Patent No.: US 12,537,467 B2
(45) Date of Patent: Jan. 27, 2026

(54) METHOD AND APPARATUS FOR ESTIMATING A ROTOR POSITION ANGLE OF A MOTOR, MOTOR CONTROL SYSTEM AND MEDIUM

(71) Applicant: Infineon Technologies AG, Neubiberg (DE)

(72) Inventors: Ronghua Zhang, Xi'an Shaanxi (CN); Shunfan Xing, Shanghai (CN)

(73) Assignee: Infineon Technologies AG, Neubiberg (DE)

( * ) Notice: Subject to any disclaimer, the term of this patent is extended or adjusted under 35 U.S.C. 154(b) by 109 days.

(21) Appl. No.: 18/359,500

(22) Filed: Jul. 26, 2023

(65) Prior Publication Data

US 2024/0039443 A1    Feb. 1, 2024

(30) Foreign Application Priority Data

Jul. 28, 2022    (CN) .......................... 202210900071.1

(51) Int. Cl.
*H02P 21/18*    (2016.01)
*G01B 7/30*    (2006.01)
*G01D 5/20*    (2006.01)

(52) U.S. Cl.
CPC ................ *H02P 21/18* (2016.02); *G01B 7/30* (2013.01); *G01D 5/20* (2013.01)

(58) Field of Classification Search
CPC ........ H02P 21/18; H02P 6/182; H02P 21/141; H02P 21/14; H02P 21/22; H02P 21/0003; H02P 21/13; H02P 25/064; H02P 27/08; G01B 7/30; G01D 5/20; G01D 3/036
See application file for complete search history.

(56) References Cited

U.S. PATENT DOCUMENTS

2023/0006582 A1*    1/2023    Wang ................... H02M 1/0009

FOREIGN PATENT DOCUMENTS

| CN | 109600089 B | * | 1/2022 | .............. H02P 21/18 |
| CN | 114696695 A | * | 7/2022 | ........... H02P 21/0003 |

OTHER PUBLICATIONS

Xu, Improved Nonlinear Flux Observer Based Second-Order SOIFO for PMSM Sensorless Control, 2018, IEEE, 1-14 (Year: 2018).*

* cited by examiner

*Primary Examiner* — Bickey Dhakal
(74) *Attorney, Agent, or Firm* — Slater Matsil, LLP

(57) ABSTRACT

Disclosed are a method and apparatus for estimating a rotor position angle of an electric machine, an electric machine control system comprising the apparatus, and a computer-readable storage medium. The method comprises obtaining a back emf of a stator of the electric machine; performing a second-order generalized integrator operation on the back emf, to obtain a signal with a phase lag of 90 degrees with respect to the back emf; dividing the phase-lagging signal by a resonant frequency of the back emf to obtain a stator flux linkage of the stator, then subtracting an inductive magnetic flux of the stator from the stator flux linkage to obtain a rotor flux linkage; and computing a rotor position angle based on the rotor flux linkage.

21 Claims, 9 Drawing Sheets

METHOD AND APPARATUS FOR ESTIMATING A ROTOR POSITION ANGLE OF A MOTOR, MOTOR CONTROL SYSTEM AND MEDIUM

CROSS-REFERENCE TO RELATED APPLICATIONS

This application claims the benefit of Chinese Patent Application No. 202210900071.1, filed on Jul. 28, 2022, which application is hereby incorporated herein by reference.

TECHNICAL FIELD

The present disclosure relates generally to the field of electronics, in particular to electric machine control.

BACKGROUND

Rotor speed control is of vital importance in an electric machine control system. FIG. 1 shows schematically a block diagram of a control system for a permanent magnet synchronous motor (PMSM) or a brushless DC motor (BLDC). As shown in FIG. 1, the control system 10 comprises a rotor position observer 11 and another control system module.

In general, rotor speed control can be achieved by estimating rotor position on the basis of rotor flux linkage. As shown in FIG. 2, since the direction of the permanent magnet flux linkage always coincides with the direction of the D axis (i.e., the NS axis) of the rotor, a voltage model of the electric machine can be used to estimate the rotor flux linkage $\Psi_p$, and then estimate the position angle $\varphi$ and the angular frequency $\omega_{cal}$ of the rotor:

rotor flux linkage:

$$\Psi_{p\alpha} = \int(u_{s\alpha} - R_s \cdot i_{s\alpha})dt - L_s \cdot i_{s\alpha}$$

$$\Psi_{p\beta} = \int(u_{s\beta} - R_s \cdot i_{s\beta})dt - L_s \cdot i_{s\beta} \quad (1)$$

rotor position angle:

$$\varphi = \arctan(\Psi_{p\beta}/\Psi_{p\alpha}) \quad (2)$$

rotor angular velocity:

$$\omega_{cal} = d\varphi/dt \quad (3)$$

wherein:

$R_S$ denotes stator resistance;

$L_s$ denotes stator inductance, which may be obtained through measurement with an instrument;

$i_{s\alpha}$ and $i_{s\beta}$ denote sampled current signals of the stator winding, and may be obtained by the rotor position observer 11 shown in FIG. 1 performing real-time sampling of current passing through an inverter 12; and $u_{s\alpha}$ and $u_{s\beta}$ denote two phase stationary voltage control signals of the stator, and may be obtained by means of a Q-axis (torque) current regulator and a D-axis (excitation) current regulator in the electric machine control system.

It should be understood that $R_S \cdot i_{s\alpha}$ and $R_S \cdot i_{s\beta}$ denote two phase stationary voltage signals across the resistance of the electric machine, and $L_s \cdot i_{s\alpha}$ and $L_s \cdot i_{s\beta}$ denote the inductive magnetic flux of the stator.

An integration step is included in the formula (1) for computing rotor flux linkage. If there is even a very small DC offset in the stator current sampling, it will result in a DC offset contained in the rotor flux linkage affecting the precision of rotor position angle estimation due to the integral windup effect.

A solution has already been proposed that uses a low-pass filter instead of the pure integration step. However, that solution is not able to completely solve the problem caused by DC offset.

FIG. 3A shows output waveforms obtained using a low-pass filter and an integration step. As shown in FIG. 3A, curve (a) is the waveform of an input signal, curve (b) is the waveform resulting from integration of the input signal, and curve (c) is the waveform resulting from low-pass filtering of the input signal. As can be seen, curve (b) and curve (c) both have offset to different degrees. It should be pointed out that the DC input signal represented by curve (a) contains 1/1000 DC offset.

To completely solve the problem of DC offset, a high-pass filter may be used after the low-pass filter, or a feedback loop may be added between the input end and output end of the low-pass filter, as shown in FIG. 3B. However, such strategies will make the control system complicated, because the filter will introduce a phase angle lag into the system, and still cannot completely solve the problem of DC offset.

SUMMARY

A concise overview of the content of the present disclosure is given below, in order to provide a basic understanding of some aspects of the content of the present disclosure. It should be understood that this overview is not an exhaustive overview of the content of the present disclosure. It is not intended to determine key or important parts of the content of the present disclosure, nor to define the scope of the content of the present disclosure. Its purpose is merely to set out some concepts in simplified form, to serve as a preamble to the more detailed description discussed below.

According to one aspect of the present disclosure, a method for estimating a rotor position angle of an electric machine is provided, comprising: obtaining a back emf of a stator of the electric machine; performing a second-order generalized integrator (SOGI) operation on the back emf, to obtain a signal with a phase lag of 90 degrees with respect to the back emf; dividing the phase-lagging signal by a resonant frequency of the back emf to obtain a stator flux linkage of the stator, then subtracting an inductive magnetic flux of the stator from the stator flux linkage to obtain a rotor flux linkage; and computing a rotor position angle by means of the rotor flux linkage.

Preferably, the resonant frequency is equal to a preset electrical angular frequency of the electric machine.

Preferably, the resonant frequency is obtained by inputting a d-axis component of positive sequence components of the signal obtained by performing the SOGI operation on the back emf into a phase-locked loop circuit.

Preferably, the back emf is a voltage signal of the difference between an associated voltage signal of the stator and a voltage drop across a resistance of the stator, the voltage drop across the resistance being obtained by multiplying a sampled current signal of a winding of the stator by the resistance of the stator.

Preferably, the method further comprising: obtaining an estimated rotor position angle by finding the arctangent of the rotor flux linkage, and obtaining an estimated electrical angular frequency by finding the derivative of the estimated rotor position angle; and computing a q-axis component and a d-axis component of a reference current signal on the basis of the estimated electrical angular frequency and a preset electrical angular frequency of the electric machine.

Preferably, the step of computing a q-axis component and a d-axis component of a reference current signal on the basis of the estimated electrical angular frequency and a preset electrical angular frequency of the electric machine comprises: computing a reference torque on the basis of the estimated electrical angular frequency and the preset electrical angular frequency, and computing the q-axis component and d-axis component of the reference current signal on the basis of the reference torque and the estimated electrical angular frequency.

Preferably, the method further comprises: obtaining a q-axis component and a d-axis component of the associated voltage signal on the basis of the q-axis component and d-axis component of the reference current signal and a q-axis component and a d-axis component of the sampled current signal of the winding of the stator; and applying the inverse Park transformation to the q-axis component and d-axis component of the associated voltage signal to obtain two phase stationary voltage signals.

Preferably, the method further comprises: applying the Clarke transformation and the Park transformation successively to three phase sampled current signals of the winding of the stator to obtain a transformed q-axis component and a transformed d-axis component of the three phase sampled current signals.

Preferably, the method further comprises: applying the Clarke transformation to the three phase sampled current signals to obtain two phase stationary current signals, then multiplying by the resistance to obtain corresponding voltage signals across the inductance.

Preferably, the method further comprises: performing an arctangent operation on two phase rotor flux linkages obtained on the basis of the corresponding voltage signals across the inductance and the two phase stationary voltage signals of the associated voltage signal, to obtain the rotor position angle.

According to another aspect of the present disclosure, an apparatus for estimating a rotor position angle of an electric machine is provided, comprising: a reference signal generating module, configured to generate a reference current signal; a current regulating module, configured to generate an associated voltage signal of the stator on the basis of the reference current signal and a sampled current signal of a winding of the stator; and an estimating module, configured to: obtain a back emf of the stator of the electric machine, perform a SOGI operation on the back emf to obtain a signal with a phase lag of 90 degrees with respect to the back emf, divide the phase-lagging signal by a resonant frequency of the back emf to obtain a stator flux linkage of the stator, then subtract an inductive magnetic flux of the stator from the stator flux linkage to obtain a rotor flux linkage, and compute a rotor position angle by means of the rotor flux linkage.

Preferably, the estimating module further comprises a feedback unit, configured to input a d-axis component of positive sequence components of a signal obtained by performing a SOGI operation on the back emf into a phase-locked loop circuit in the feedback unit, to obtain the resonant frequency.

Preferably, the reference signal generating module further comprises: a speed regulator, configured to: obtain an estimated rotor position by finding the arctangent of the rotor flux linkage, and obtain an estimated electrical angular frequency by finding the derivative of the estimated rotor position, and compute a reference torque on the basis of the estimated electrical angular frequency and the preset electrical angular frequency; and a current generator, configured to compute a q-axis component and a d-axis component of the reference current signal on the basis of the reference torque and the estimated electrical angular frequency.

Preferably, the current regulating module further comprises: a torque current regulator, configured to compute a q-axis component of the associated voltage signal on the basis of the q-axis component of the reference current signal and the q-axis component of the sampled current signal of the winding of the stator; and an excitation current regulator, configured to compute a d-axis component of the associated voltage signal on the basis of the d-axis component of the reference current signal and the d-axis component of the sampled current signal of the winding of the stator.

Preferably, the torque current regulator and the excitation current regulator are based on proportional-integral-derivative control or a pole-zero configuration.

Preferably, the estimating module is further configured to: apply the inverse Park transformation to the q-axis component and d-axis component of the associated voltage signal to obtain two phase stationary voltage signals; and apply the Clarke transformation to the three phase sampled current signals to obtain two phase stationary current signals, then multiply by the resistance to obtain corresponding voltage signals across the inductance.

Preferably, the estimating module is further configured to: perform an arctangent operation on two phase rotor flux linkages obtained on the basis of the corresponding voltage signals across the inductance and the two phase stationary voltage signals of the associated voltage signal, to obtain the rotor position angle.

According to another aspect of the present disclosure, an electric machine control system is provided, comprising the apparatus described above for estimating a rotor position angle.

According to another aspect of the present disclosure, a computer-readable storage medium is provided, having stored thereon a program which, when executed by a processor, causes a computer to perform the method described above for estimating a rotor position angle.

The solution of the present disclosure realizes an integration function with no phase angle difference in a low-cost manner and thereby perfectly solves the problem of integration error in flux linkage computation caused by DC offset signals in current sampling, thus increasing rotor angle precision and electric machine control efficiency.

These and other advantages of the present disclosure will become clearer through the following detailed description of preferred embodiments of the present disclosure with reference to the drawings.

BRIEF DESCRIPTION OF THE DRAWINGS

To further expound the above and other advantages and features of the content of the present disclosure, particular embodiments of the content of the present disclosure are explained in further detail below with reference to the drawings. The drawings together with the detailed description below are included in and form part of this specification. Elements with the same function and structure are identified with the same reference labels. It should be understood that these drawings merely describe typical examples of the content of the present disclosure, and should not be regarded as limiting the scope of the content of the present disclosure. In the drawings.

DETAILED DESCRIPTION OF ILLUSTRATIVE EMBODIMENTS

Demonstrative embodiments of the present disclosure are described below with reference to the drawings. For clarity and conciseness, not all of the features of real embodiments are described herein. However, it should be understood that many embodiment-specific decisions must be made in the process of developing any such real embodiments, in order to achieve the specific objectives of the developer, for example, comply with those limiting conditions that are related to the system and service, and these limiting conditions might change depending on the embodiment in question. Furthermore, it should also be understood that although development work might be very complex and time-consuming, such development work is merely a routine task for a person skilled in the art who benefits from the content of the present disclosure.

Another point that needs to be explained here is that in order to avoid blurring the present disclosure with unnecessary details, the drawings only show device structures and/or processing steps that are closely related to the solution according to the present disclosure, and omit other details that are not very relevant to the present disclosure.

As stated above, existing methods for computing rotor position angle have many shortcomings. The present disclosure is intended to propose a method for estimating rotor position angle based on a second-order generalized integrator (SOGI). The method realizes an integration function with no phase angle difference in a low-cost manner and thereby perfectly solves the problem of integration error in flux linkage computation caused by DC offset signals in current sampling, thus increasing rotor angle precision and electric machine control efficiency.

A method according to embodiments of the present disclosure for estimating a rotor position angle of an electric machine is described below with reference to FIGS. 4-7B.

Figure 1:
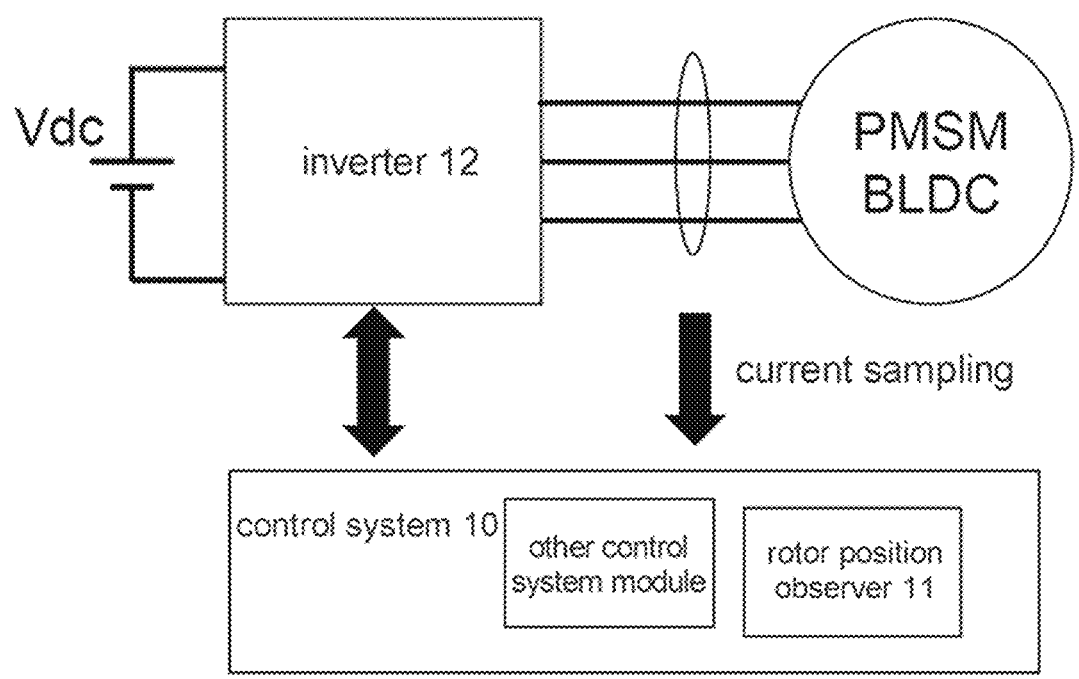
FIG. 1 shows schematically a block diagram of a control system for a PMSM or BLDC.
Figure 2:
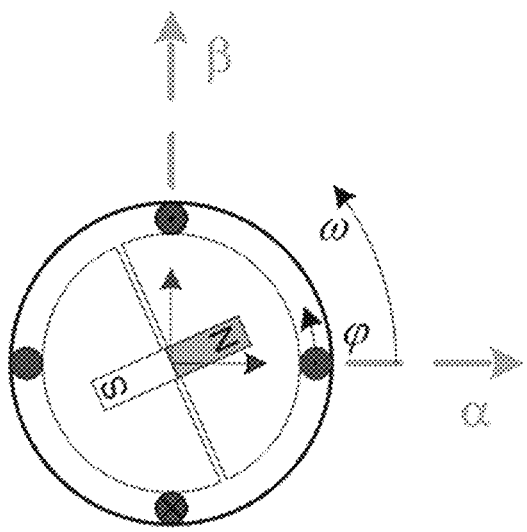
FIG. 2 shows schematically a position angle and angular velocity of a rotor.
Figure 3A:
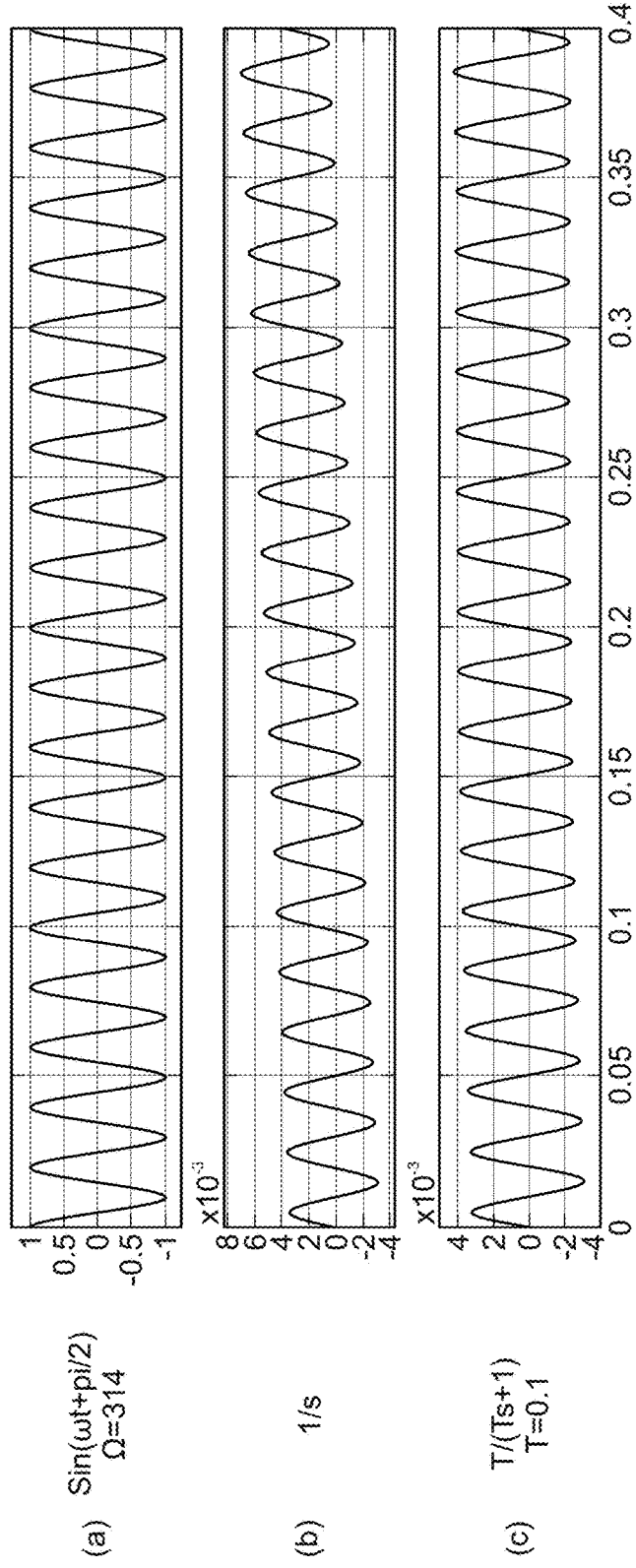
FIG. 3A is a waveform graph of an input signal and output signals of an electric machine control system according to an existing technical solution.
Figure 3B:
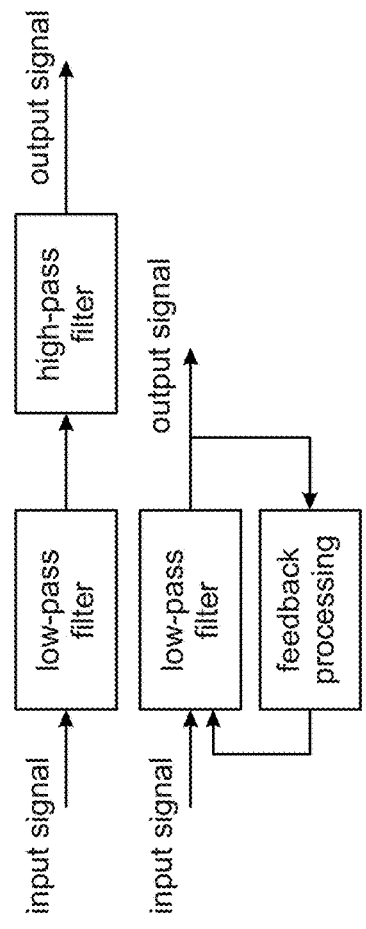
FIG. 3B shows schematically a block diagram of a DC offset solution according to an existing technical solution.
Figure 4:
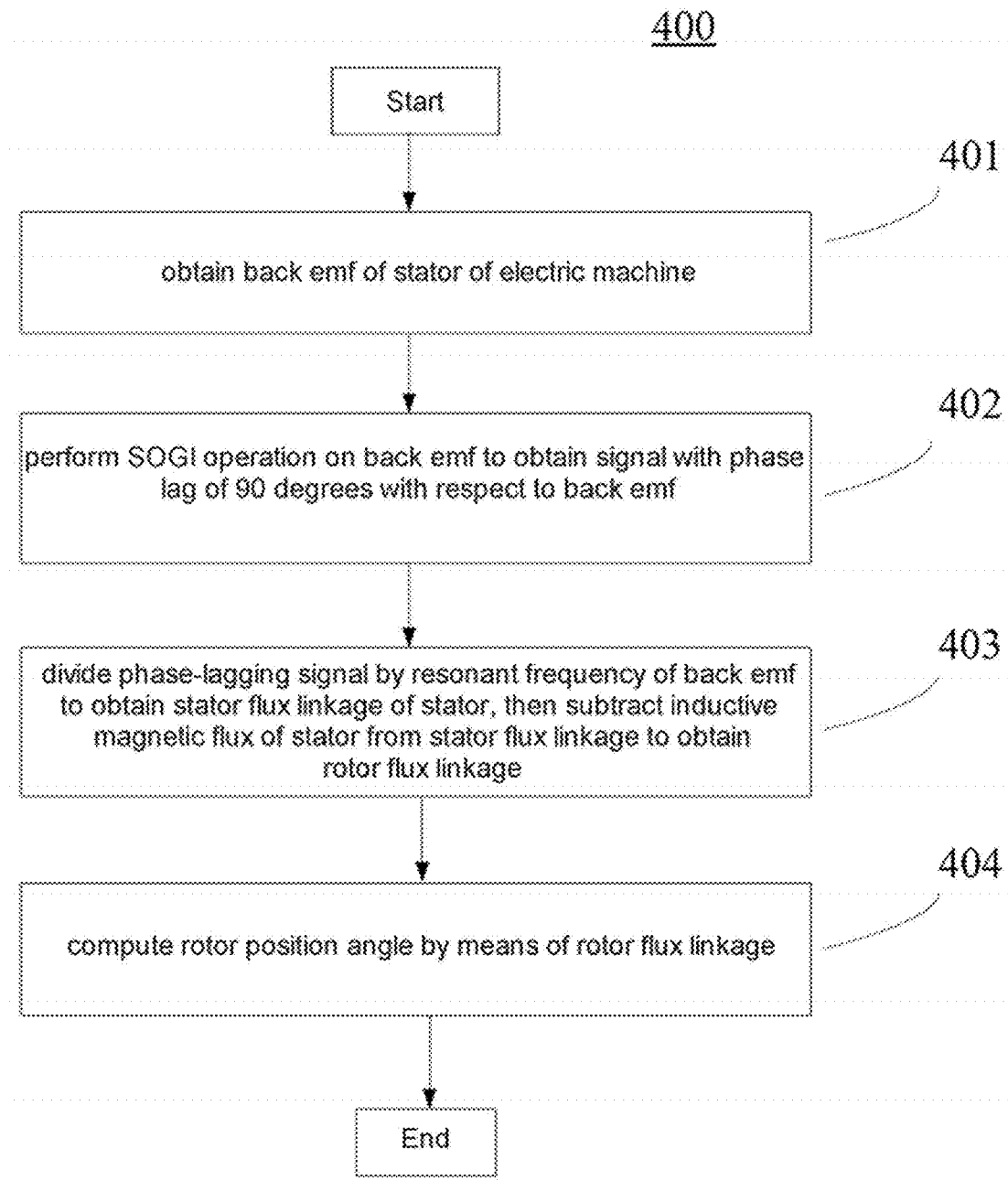
FIG. 4 is a flow chart of a method according to embodiments of the present disclosure for estimating a rotor position angle of an electric machine.

FIG. 4 shows a method 400 according to embodiments of the present disclosure for estimating a rotor position angle of an electric machine.

First of all, in step 401, a back emf of a stator of the electric machine is obtained.

Figure 5:
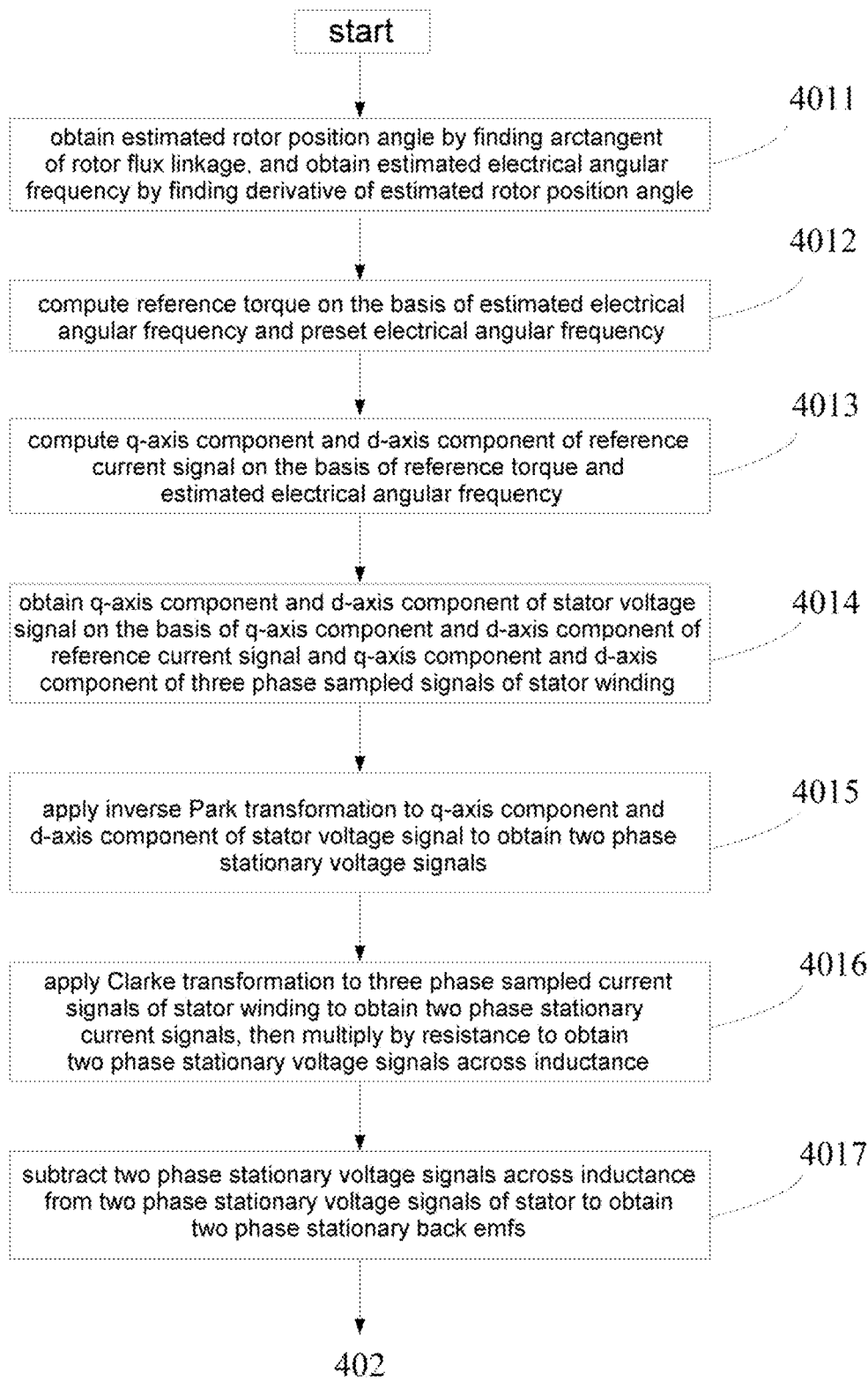
FIG. 5 is a flow chart of a process of obtaining a back emf of a stator according to a preferred embodiment of the present disclosure.

According to a preferred embodiment, two phase stationary back emfs of the electric machine stator are obtained according to the process shown in FIG. 5.

As shown in FIG. 5, first of all, in step 4011, an estimated rotor position angle φ is obtained by finding the arctangent (atan) of rotor flux linkage $\Psi_{p\alpha}$, $\Psi_{p\beta}$, and an estimated electrical angular frequency $\omega_{cal}$ is obtained by finding the derivative of the estimated rotor position angle, as shown in formulae (2) and (3) above.

It should be understood that in some embodiments, a preset electrical angular frequency $\omega_{ref}$ and the estimated electrical angular frequency $\omega_{cal}$ when the electric machine is started are both equal to zero.

Next, in step 4012, a reference torque is computed on the basis of the estimated electrical angular frequency $\omega_{cal}$ and the preset electrical angular frequency $\omega_{ref}$. Specifically, in this embodiment, a speed regulator 7011 in a reference signal generating module 701 as shown in FIG. 7B may be used to compute a reference torque $T_{ref}$.

It should be pointed out that a method of computing a reference torque of an electric machine is already known to those skilled in the aft, so is not described again here.

It should be pointed out that the preset electrical angular frequency $\omega_{ref}$ is related to a desired target rotation speed of the electric machine, and may be a manually set target value.

Next, in step 4013, a q-axis component and a d-axis component of a reference current signal are computed on the basis of the reference torque $T_{ref}$ and the estimated electrical angular frequency $\omega_{cal}$. Specifically, in this embodiment, a current generator 7012 in the reference signal generating module 701 as shown in FIG. 7B may be used to compute the q-axis component $i_{qref}$ and the d-axis component $i_{dref}$ the reference current signal on the basis of an MTPA (maximum torque per ampere) method.

It should be pointed out that the present disclosure is not limited to using an MTPA method to compute the q-axis and d-axis components of the reference current signal, and may use any other suitable method.

Next, in step 4014, based on the q-axis component $i_{qref}$ and the d-axis component $i_{dref}$ of the reference current signal and a q-axis component $i_{qfd}$ and a d-axis component $i_{dfd}$ of three phase sampled current signals $i_{sa}$, $i_{sb}$, $i_{sc}$ of the stator winding, a q-axis component $u_{sqref}$ and a d-axis component $u_{sdref}$ of a stator voltage reference signal outputted by a controller is obtained.

It should be understood that by applying the Clarke transformation and the Park transformation successively to the three phase sampled current signals $i_{sa}$, $i_{sb}$, $i_{sc}$ of the stator winding, a transformed q-axis component and a transformed d-axis component of the three phase sampled current signals can be obtained.

Specifically, in this embodiment, two phase stationary current signals $i_{s\alpha fd}$, $i_{s\beta fd}$ may be obtained using the Clarke transformation as shown in the formula below:

$$\begin{bmatrix} i_{s\alpha fd} \\ i_{s\beta fd} \end{bmatrix} = \begin{bmatrix} 1 & -\frac{1}{2} & -\frac{1}{2} \\ 0 & \frac{\sqrt{3}}{2} & -\frac{\sqrt{3}}{2} \end{bmatrix} \begin{bmatrix} i_{sa} \\ i_{sb} \\ i_{sc} \end{bmatrix} \quad (4)$$

The transformed q-axis component $i_{qfd}$ and d-axis component $i_{dfd}$ of the three phase sampled current signals may be obtained using the Park transformation as shown in the formula below:

$$\begin{bmatrix} i_{dfd} \\ i_{qfd} \end{bmatrix} = \begin{bmatrix} \cos\theta & \sin\theta \\ -\sin\theta & \cos\theta \end{bmatrix} \begin{bmatrix} i_{s\alpha fd} \\ i_{s\beta fd} \end{bmatrix} \quad (5)$$

It should be understood that θ in formula (5) above refers to the rotor position angle of the electric machine.

Figure 7A:
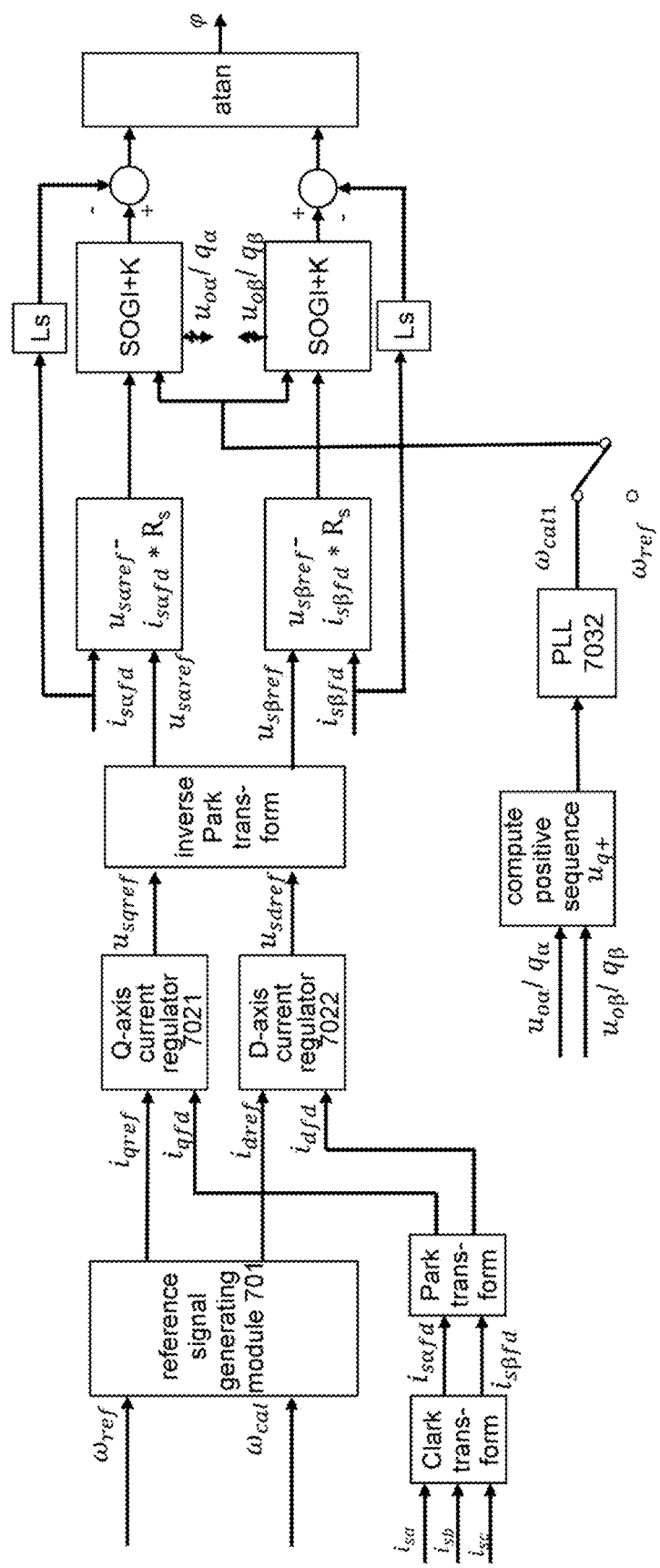
FIG. 7A shows schematically, in the form of a block diagram, a process of estimating a rotor position angle of an electric machine according to embodiments of the present disclosure.
Figure 7B:
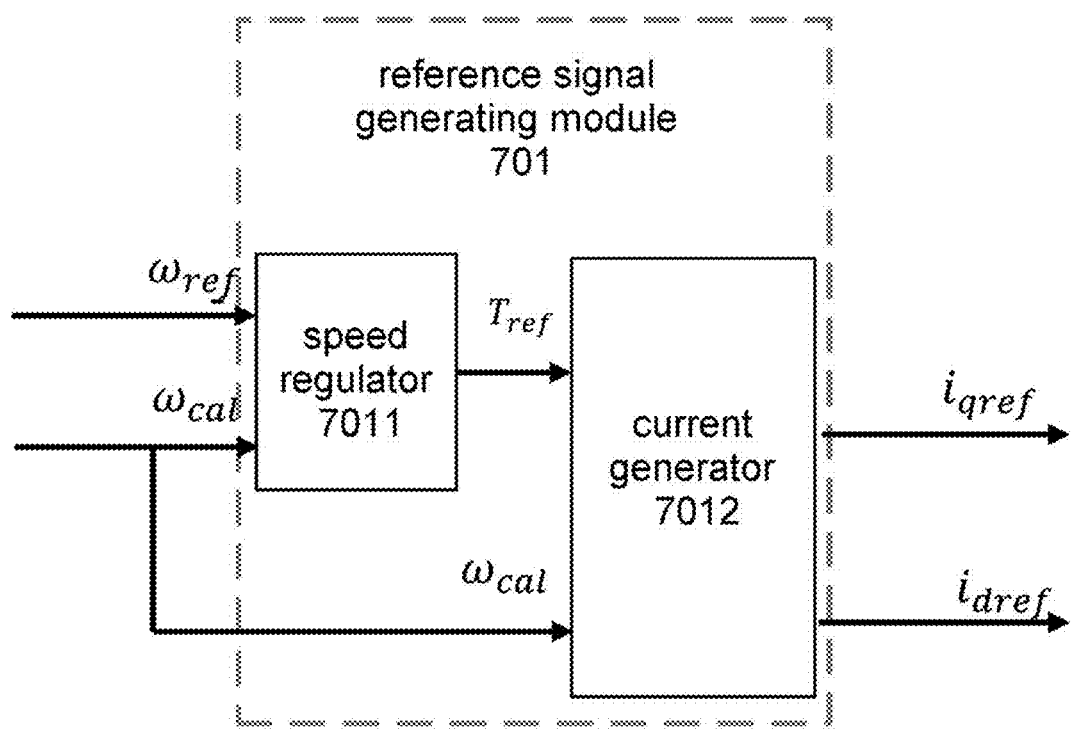
FIG. 7B shows the detailed structure of the reference signal generating module in FIG. 7A.

After obtaining the transformed q-axis component $i_{qfd}$ and d-axis component $i_{dfd}$ of the three phase sampled current signals, a Q-axis current regulator 7021 as shown in FIG. 7A may be used to compute a q-axis component $u_{sqref}$ of the stator voltage signal on the basis of the q-axis component $i_{qref}$ of the reference current signal and the q-axis component $i_{qfd}$ of the three phase sampled current signals of the stator winding, and a D-axis current regulator 7022 as shown in FIG. 7A may be used to compute a d-axis component $u_{sdref}$ of the stator voltage signal on the basis of the d-axis component $i_{dref}$ of the reference current signal and the d-axis component $i_{dfd}$ of the three phase sampled current signals of the stator winding.

It should be understood that the stator voltage signals $u_{sqref}$ and $u_{sdref}$ vary continuously as the rotor rotation speed of the electric machine is continuously regulated.

It should be pointed out that the computations in the Q-axis current regulator 7021 and the D-axis current regulator 7022 are known, and not described again here. For example, the Q-axis current regulator 7021 and the D-axis current regulator 7022 may be realized on the basis of proportional-integral-derivative (PID) control or a pole-zero configuration.

Next, in step 4015, the inverse Park transformation is applied to the q-axis component $u_{sqref}$ and d-axis component $u_{sdref}$ of the stator voltage signal to obtain two phase stationary voltage signals $u_{s\alpha ref}$, $u_{s\beta ref}$.

Specifically, in this embodiment, the two phase stationary voltage signals $u_{s\alpha ref}$, $u_{s\beta ref}$ may be obtained using the inverse Park transformation as shown in the following formula:

$$\begin{bmatrix} u_{s\alpha ref} \\ u_{s\beta ref} \end{bmatrix} = \begin{bmatrix} \cos\theta & -\sin\theta \\ \sin\theta & \cos\theta \end{bmatrix} \begin{bmatrix} u_{sdref} \\ u_{sqref} \end{bmatrix} \quad (6)$$

Next, in step 4016, the Clarke transformation is applied to the three phase sampled current signals $i_{sa}$, $i_{sb}$, $i_{sc}$ of the stator winding to obtain two phase stationary current signals $i_{s\alpha fd}$, $i_{s\beta fd}$, which are then multiplied by the resistance $R_S$ to obtain two phase stationary voltage signals $i_{s\alpha fd} \cdot R_S$, $i_{s\beta fd} \cdot R_S$ across the stator inductance.

It should be understood that the resistance $R_S$ represents the resistance of the stator.

It should also be understood that the physical meaning of stator inductance herein is the inductance of the stator winding itself.

Finally, in step 4017, the two phase stationary voltage signals $i_{s\alpha fd} \cdot R_S$, $i_{s\beta fd} \cdot R_S$ across the inductance are subtracted from the two phase stationary voltage signals $u_{s\alpha ref}$, $u_{s\beta ref}$ of the stator respectively, to obtain two phase stationary back emfs $(u_{s\alpha ref} - i_{s\alpha fd} \cdot R_S)$, $(u_{s\beta ref} - i_{s\beta fd} \cdot R_S)$.

It should be pointed out that the process shown in FIG. 5 is merely one example of obtaining the back emf; the present disclosure is not limited to this, and may use any other suitable method to obtain the back emf.

Returning to FIG. 4, after obtaining the back emf, in step 402 a second-order generalized integrator (SOGI) operation is performed on the back emf to obtain signals $q_\alpha$, $q_\beta$ with a phase lag of 90 degrees with respect to the back emf.

Specifically, in this embodiment, a SOGI operation is performed on the two phase stationary back emfs $(u_{s\alpha ref} - i_{s\alpha fd} \cdot R_S)$, $(u_{s\beta ref} - i_{s\beta fd} \cdot R_S)$ separately. As is already known, the transfer function of SOGI may be expressed as:

$$SOGI(s) = \frac{u_o}{k\varepsilon}(s) = \frac{\omega_f s}{s^2 + \omega_f^2} \quad (7)$$

where:
- s is a complex parameter, and generally referred to as the complex frequency;
- $u_o$ is an output signal with the same phase as an input signal $u_i$;
- $\omega_f$ represents the resonant frequency of SOGI;
- k represents the scale parameter of SOGI; and
- $\varepsilon$ represents the error signal of $u_o - u_i$.

SOGI has two output signals $u_o$ and q. The transfer functions of these two output signals for the input signal $u_i$ are respectively:

$$D(s) = \frac{u_o}{u_i}(s) = \frac{k\omega_i s}{s^2 + k\omega_i s + \omega_f^2} \quad (8)$$

$$Q(s) = \frac{q}{u_i}(s) = \frac{k\omega_f^2}{s^2 + k\omega_f s + \omega_f^2} \quad (9)$$

Q(s) is a low-pass filter, and the output signal q lags the output signal $u_o$ by a phase angle of 90° at the resonant frequency $\omega_f$. That is to say, the two output signals $u_o$ and q have an orthogonal relationship. Thus, using the transfer function Q(s), it is possible to obtain signals $q_\alpha$, $q_\beta$ with a phase lag of 90 degrees with respect to the back emfs $(u_{s\alpha ref} - i_{s\alpha fd} \cdot R_S)$ and $(u_{s\beta ref} - i_{s\beta fd} \cdot R_S)$.

Next, in step 403, the phase-lagging signals $q_\alpha$, $q_\beta$ are divided by the resonant frequency $\omega_f$ of the back emf to obtain stator flux linkages $\int(u_{s\alpha ref} - i_{s\alpha fd} \cdot R_S)dt$ and $\int(u_{s\beta ref} - i_{s\beta fd} \cdot R_S)dt$ of the stator, then the inductive magnetic fluxes $L_s \cdot i_{s\alpha}$ and $L_s \cdot i_{s\beta}$ of the stator are respectively subtracted from the stator flux linkages to obtain two phase stationary rotor flux linkages $\Psi_{p\alpha}$, $\Psi_{p\beta}$, as shown in formula (1).

It should be pointed out that the initial value of the resonant frequency $\omega_f$ is equal to o.

Optionally, the resonant frequency cof may be equal to the preset electrical angular frequency $\omega_{ref}$ of the electric machine.

Figure 6:
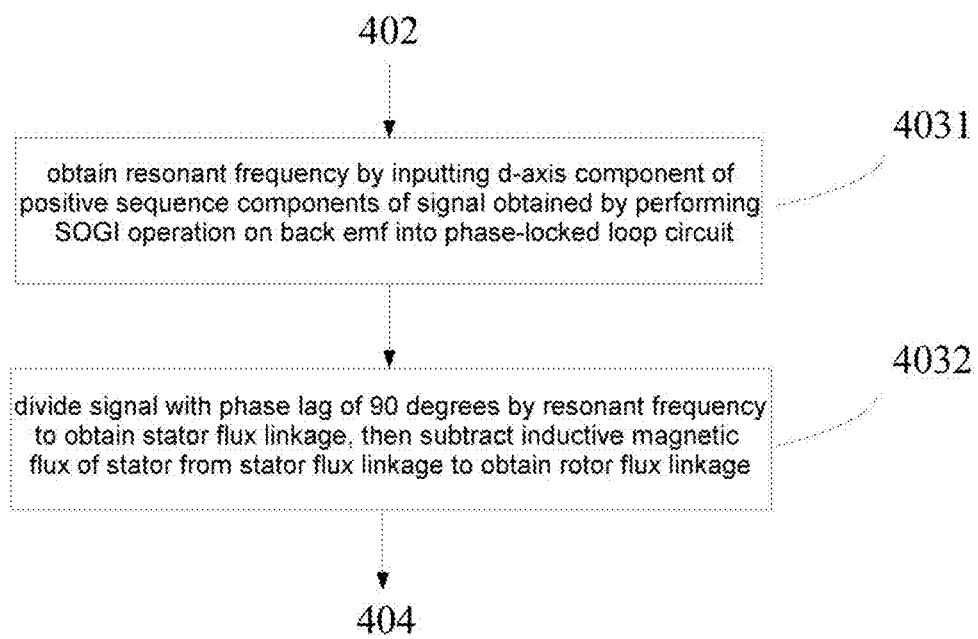
FIG. 6 is a flow chart of a process of obtaining a rotor flux linkage according to a preferred embodiment of the present disclosure.

According to a preferred embodiment, step 403 may also be realized by the process shown in FIG. 6.

As shown in FIG. 6, in step 4031, a d-axis component of positive sequence components of a signal obtained by performing a SOGI operation on the back emf is inputted into a phase-locked loop circuit to obtain the resonant frequency. Specifically, as shown in FIG. 7A, signals $u_{o\alpha}/q_\alpha$, $u_{o\beta}/q_\beta$ may be obtained after subjecting the back emf to SOGI computation. Positive sequence components $q_\alpha^+$ and $q_\beta^+$ may be obtained by subjecting the signals $u_{o\alpha}/q_\alpha$, $u_{o\beta}/q_\beta$ to positive sequence computation as shown in the formulae below:

$$q_\alpha^+ = (u_{o\alpha} - q_\beta) \cdot 0.5 \quad (10)$$

$$q_\beta^+ = (q_\alpha + u_{o\beta}) \cdot 0.5 \tag{11}$$

The Park transformation as shown in formula (5) is then applied to the positive sequence components $q_\alpha^+$ and $q_\beta^+$ thus obtained, to obtain a q-axis component $u_{q+}$ of the positive sequence signal. An electrical angular frequency $\omega_{cal1}$ obtained by inputting the q-axis component $u_{q+}$ into a phase-locked loop PLL 7032 may be used as the resonant frequency.

Next, in step 4032, the signals $q_\alpha$, $q_\beta$ with a phase lag of 90 degrees are divided by $\omega_{cal1}$ to obtain stator flux linkages $\int(u_{s\alpha ref} - i_{s\alpha fd} \cdot R_S)dt$ and $\int(u_{s\beta ref} - i_{s\beta fd} \cdot R_S)dt$, then the inductive magnetic fluxes $L_s \cdot i_{s\alpha}$ and $L_s \cdot i_{s\beta}$ of the stator are respectively subtracted from the stator flux linkages to obtain two phase stationary rotor flux linkages $\Psi_{p\alpha}$, $\Psi_{p\beta}$.

It should be pointed out that computing the resonant frequency by the process shown in FIG. 6 can increase the computation precision of the SOGI step in the dynamic process of rotor speed variation, making it possible to increase the precision of rotor electrical angle estimation compared with using the preset electrical angular frequency $\omega_{ref}$ directly.

It should be understood that the computation in the PLL 7032 is already known in the prior art, so is not described again here.

Returning to FIG. 4, finally, in step 404, the rotor position angle is computed by means of the rotor flux linkage. Specifically, in this embodiment, an arctangent operation is performed on the two phase stationary rotor flux linkages $\Psi_{p\alpha}$, $\Psi_{p\beta}$ according to formula (2), to obtain the rotor position angle $\varphi$.

The method 400 according to embodiments of the present disclosure for estimating a rotor position angle of an electric machine has been described above with reference to FIGS. 4-7B.

Figure 9:
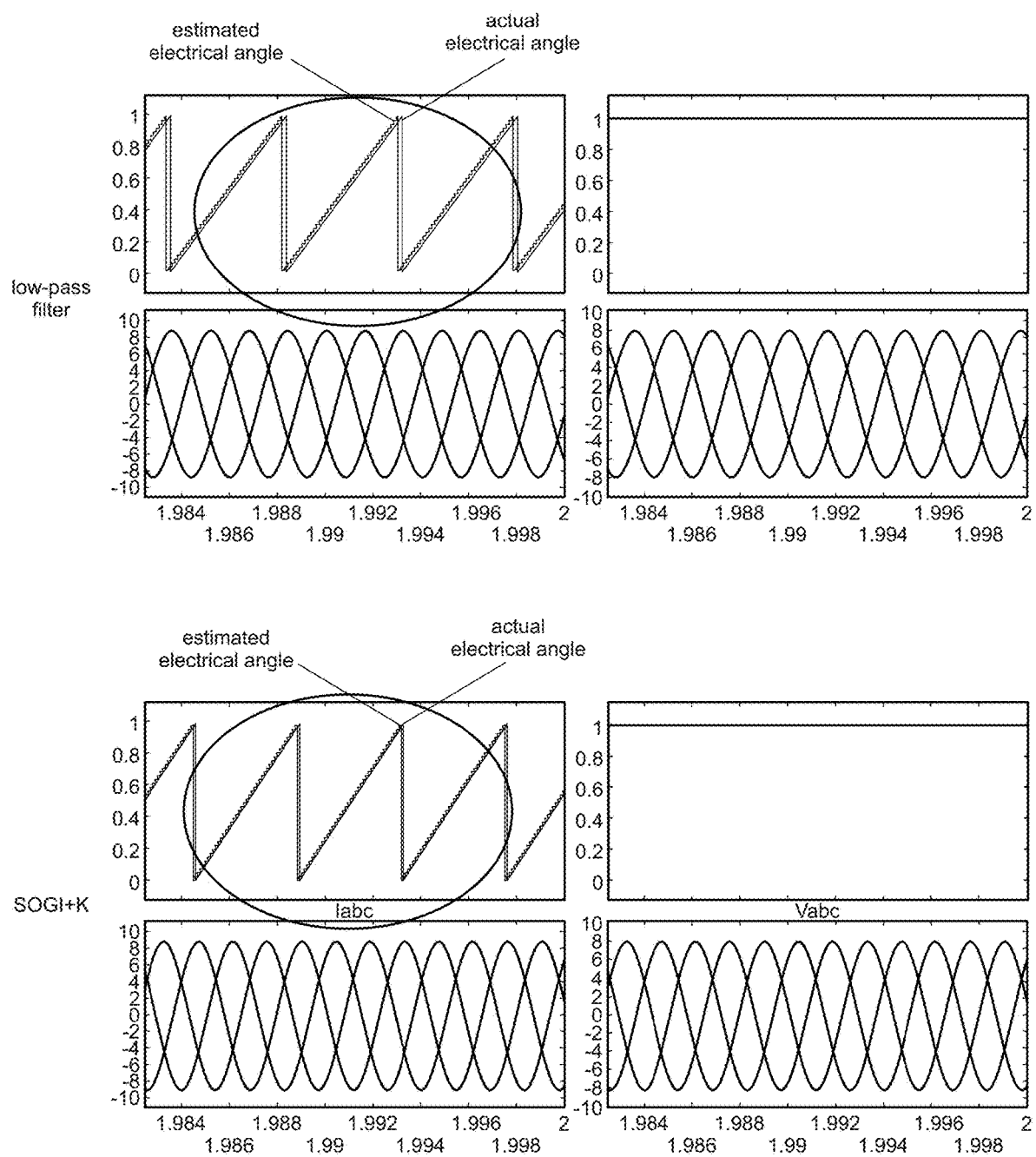
FIG. 9 shows a comparison of simulated waveforms of the actual electrical angle and estimated electrical angle obtained by a low-pass filter and by the method according to the present disclosure respectively.

FIG. 9 shows simulated waveform graphs of the actual electrical angle and estimated electrical angle obtained by a low-pass filter and by the method 400 respectively. It can be seen from FIG. 9 that, compared with the simulated waveforms of the actual electrical angle and estimated electrical angle obtained by the low-pass filter, the simulated waveform of the estimated electrical angle obtained by the method 400 of the present disclosure corresponds more closely to the simulated waveform of the actual electrical angle. Thus, the method 400 of the present disclosure realizes an integration function with no phase angle difference in a low-cost manner and thereby perfectly solves the problem of DC offset in the electric machine, thus increasing rotor angle precision and electric machine control efficiency.

Figure 8:
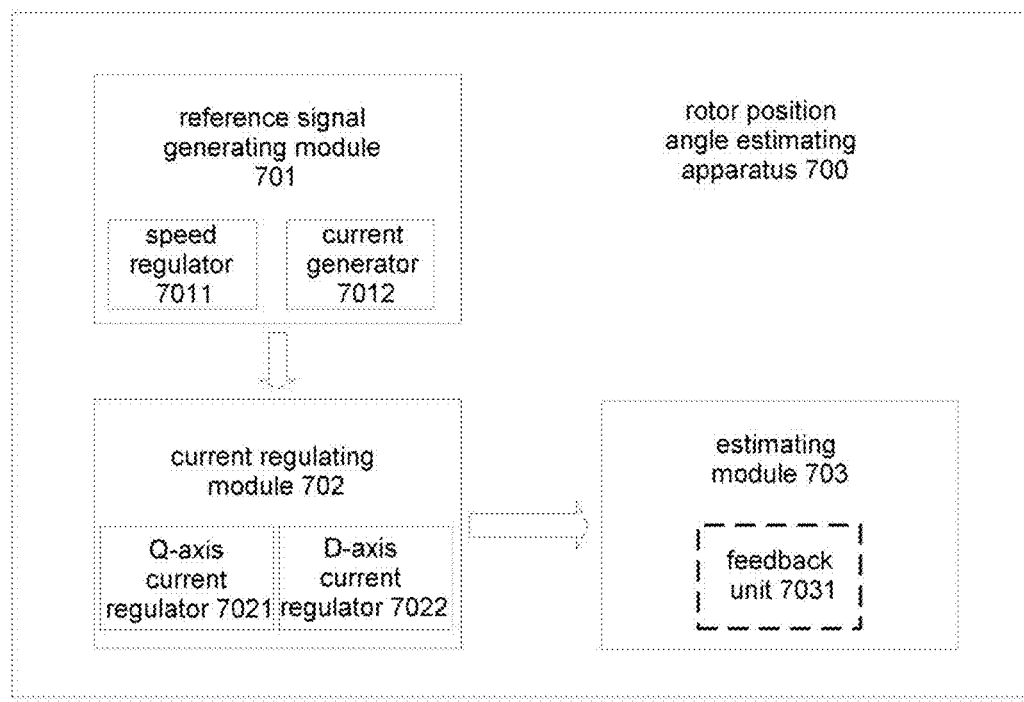
FIG. 8 is a block diagram of an apparatus according to embodiments of the present disclosure for estimating a rotor position angle of an electric machine.

FIG. 8 shows an apparatus 700 for estimating a rotor position angle according to embodiments of the present disclosure. As shown in FIG. 8, the apparatus 700 comprises a reference signal generating module 701, a current regulating module 702 and an estimating module 703. The reference signal generating module 701 is configured to generate a reference current signal. The current regulating module 702 is configured to generate an associated voltage signal of the stator on the basis of the reference current signal and a sampled current signal of a winding of the stator. The estimating module 703 is configured to obtain a back emf of the stator of the electric machine; perform a SOGI operation on the back emf to obtain a signal with a phase lag of 90 degrees with respect to the back emf; divide the phase-lagging signal by a resonant frequency of the back emf to obtain a stator flux linkage of the stator, then subtract an inductive magnetic flux of the stator from the stator flux linkage to obtain a rotor flux linkage; and compute a rotor position angle by means of the rotor flux linkage.

Preferably, the reference signal generating module 701 further comprises a speed regulator 7011 and a current generator 7012. The speed regulator 7011 is configured to obtain an estimated rotor position by finding the arctangent of the rotor flux linkage, and obtain an estimated electrical angular frequency by finding the derivative of the estimated rotor position, and compute a reference torque on the basis of the estimated electrical angular frequency and a preset electrical angular frequency. The current generator 7012 is configured to compute a q-axis component and a d-axis component of the reference current signal on the basis of the reference torque and the estimated electrical angular frequency.

Preferably, the current regulating module 702 further comprises a Q-axis current regulator 7021 and a D-axis current regulator 7022. The Q-axis current regulator 7021 is configured to compute a q-axis component of the associated voltage signal on the basis of the q-axis component of the reference current signal and a q-axis component of the sampled current signal of the winding of the stator; the D-axis current regulator 7022 is configured to compute a d-axis component of the associated voltage signal on the basis of the d-axis component of the reference current signal and a d-axis component of the sampled current signal of the winding of the stator.

Preferably, the estimating module 703 further comprises a feedback unit 7031. The feedback unit 7031 is configured to input a d-axis component of positive sequence components of a signal obtained by performing a SOGI operation on the back emf into a phase-locked loop circuit in the feedback unit 7031, to obtain the resonant frequency.

The apparatus 700 shown in FIG. 8 for estimating a rotor position angle corresponds to the method 400 shown in FIGS. 4-6 for estimating a rotor position angle of an electric machine. Thus, the relevant details about each component in the apparatus 700 for estimating a rotor position angle have already been given in the description of the method 400 of FIGS. 4-6 for estimating a rotor position angle of an electric machine, and are not repeated here.

The present disclosure further proposes an electric machine control system, comprising the apparatus for estimating a rotor position angle according to embodiments of the present disclosure.

The present disclosure further proposes a computer-readable storage medium with a program stored thereon. When executed by a processor, the program causes a computer to perform the method for estimating a rotor position angle of an electric machine according to embodiments of the present disclosure.

The present disclosure further proposes corresponding computer program code, and a computer program product storing machine-readable instruction code. When read and executed by a machine, the instruction code can perform the method for estimating a rotor position angle of an electric machine according to embodiments of the present disclosure.

At least some embodiments are defined by the examples given below.

Example 1. A method for estimating a rotor position angle of an electric machine, comprising:
 obtaining a back emf of a stator of the electric machine;
 performing a second-order generalized integrator (SOGI) operation on the back emf, to obtain a signal with a phase lag of 90 degrees with respect to the back emf;

dividing the phase-lagging signal by a resonant frequency of the back emf to obtain a stator flux linkage ($\Psi_s$) of the stator, then subtracting an inductive magnetic flux ($L_s{*}i_{sfd}$) of the stator from the stator flux linkage to obtain a rotor flux linkage ($\Psi_p$); and computing a rotor position angle ($\varphi$) by means of the rotor flux linkage.

Example 2. The method according to example 1, wherein the resonant frequency is equal to a preset electrical angular frequency ($\omega_{ref}$) of the electric machine.

Example 3. The method according to example 1, wherein the resonant frequency is obtained ($\omega_{cal1}$) by inputting a d-axis component of positive sequence components of the signal ($u_{o\alpha}/q_\alpha$, $u_{o\beta}/q_\beta$) obtained by performing the SOGI operation on the back emf into a phase-locked loop circuit.

Example 4. The method according to example 3, wherein an initial value of the resonant frequency is equal to 0.

Example 5. The method according to any one of examples 1-4, wherein the back emf is a voltage signal of the difference between an associated voltage signal ($u_{sref}$) of the stator and a voltage drop across a resistance of the stator, the voltage drop across the resistance being obtained by multiplying a sampled current signal of a winding of the stator by the resistance of the stator ($i_{sfd}{*}R_s$).

Example 6. The method according to example 5, wherein the associated voltage signal of the stator varies continuously as the rotor rotation speed of the electric machine is continuously regulated.

Example 7. The method according to example 6, further comprising:

obtaining an estimated rotor position angle by finding the arctangent of the rotor flux linkage, and obtaining an estimated electrical angular frequency ($\omega_{cal}$) by finding the derivative of the estimated rotor position angle; and computing a q-axis component ($i_{qref}$) and a d-axis component ($i_{dref}$) of a reference current signal on the basis of the estimated electrical angular frequency and a preset electrical angular frequency of the electric machine.

Example 8. The method according to example 7, wherein the step of computing a q-axis component and a d-axis component of a reference current signal on the basis of the estimated electrical angular frequency and a preset electrical angular frequency of the electric machine comprises:

computing a reference torque on the basis of the estimated electrical angular frequency and the preset electrical angular frequency, and computing the q-axis component and d-axis component of the reference current signal on the basis of the reference torque and the estimated electrical angular frequency.

Example 9. The method according to example 8, further comprising:

obtaining a q-axis component ($u_{sqref}$) and a d-axis component ($u_{sdref}$) of the associated voltage signal on the basis of the q-axis component ($i_{qref}$) and d-axis component of the reference current signal and a q-axis component ($i_{qfd}$) and a d-axis component ($i_{dfd}$) of the sampled current signal of the winding of the stator; and applying the inverse Park transformation to the q-axis component and d-axis component of the associated voltage signal to obtain two phase stationary voltage signals $u_{s\alpha ref}$, $u_{s\beta ref}$).

Example 10. The method according to example 9, further comprising:

applying the Clarke transformation and the Park transformation successively to three phase sampled current signals of the winding of the stator to obtain a transformed q-axis component ($i_{qfd}$) and a transformed d-axis component ($i_{dfd}$) of the three phase sampled current signals.

Example 11. The method according to example 10, further comprising:

applying the Clarke transformation to the three phase sampled current signals to obtain two phase stationary current signals ($i_{s\alpha fd}$, $i_{s\beta fd}$), then multiplying by the resistance to obtain corresponding voltage signals across the inductance.

Example 12. The method according to example 11, further comprising:

performing an arctangent operation on two phase rotor flux linkages obtained on the basis of the corresponding voltage signals across the inductance and the two phase stationary voltage signals of the associated voltage signal, to obtain the rotor position angle.

Example 13. An apparatus for estimating a rotor position angle of an electric machine, comprising:

a reference signal generating module, configured to generate a reference current signal;

a current regulating module, configured to generate an associated voltage signal of the stator on the basis of the reference current signal and a sampled current signal of a winding of the stator; and an estimating module, configured to:
obtain a back emf of the stator of the electric machine;
perform a SOGI operation on the back emf to obtain a signal with a phase lag of 90 degrees with respect to the back emf;
divide the phase-lagging signal by a resonant frequency of the back emf to obtain a stator flux linkage ($\Psi_s$) of the stator, then subtract an inductive magnetic flux of the stator from the stator flux linkage to obtain a rotor flux linkage; and
compute a rotor position angle by means of the rotor flux linkage.

Example 14. The apparatus according to example 13, wherein the resonant frequency is equal to a preset electrical angular frequency of the electric machine.

Example 15. The apparatus according to example 13, wherein the estimating module further comprises a feedback unit, configured to input a d-axis component of positive sequence components of a signal obtained by performing a SOGI operation on the back emf into a phase-locked loop circuit in the feedback unit, to obtain the resonant frequency.

Example 16. The apparatus according to example 15, wherein an initial value of the resonant frequency is equal to 0.

Example 17. The apparatus according to any one of examples 13-16, wherein the back emf is a voltage signal of the difference between an associated voltage signal ($u_{sref}$) of the stator and a voltage drop across a resistance of the stator, the voltage drop across the resistance being obtained by multiplying a sampled current signal of a winding of the stator by the resistance of the stator ($i_{sfa}{*}R_s$).

Example 18. The apparatus according to example 17, wherein the associated voltage signal of the stator varies continuously as the rotor rotation speed of the electric machine is continuously regulated.

Example 19. The apparatus according to example 18, wherein the reference signal generating module further comprises:

a speed regulator, configured to:
obtain an estimated rotor position by finding the arctangent of the rotor flux linkage, and obtain an estimated electrical angular frequency by finding the derivative of the estimated rotor position, and compute a reference torque on the basis of the estimated electrical angular frequency and the preset electrical angular frequency; and a current generator, configured to compute a q-axis component and a d-axis component of the reference current signal on the basis of the reference torque and the estimated electrical angular frequency.

Example 20. The apparatus according to example 19, wherein the current regulating module further comprises:

a torque current regulator, configured to compute a q-axis component of the associated voltage signal on the basis of the q-axis component of the reference current signal and the q-axis component of the sampled current signal of the winding of the stator; and an excitation current regulator, configured to compute a d-axis component of the associated voltage signal on the basis of the d-axis component of the reference current signal and the d-axis component of the sampled current signal of the winding of the stator.

Example 21. The apparatus according to example 20, wherein the torque current regulator and the excitation current regulator are based on proportional-integral-derivative control or a pole-zero configuration.

Example 22. The apparatus according to example 20, wherein the Clarke transformation and the Park transformation are successively applied to three phase sampled current signals of the winding of the stator to obtain a transformed q-axis component and a transformed d-axis component of the three phase sampled current signals.

Example 23. The apparatus according to example 22, wherein the estimating module is further configured to:

apply the inverse Park transformation to the q-axis component and d-axis component of the associated voltage signal to obtain two phase stationary voltage signals; and apply the Clarke transformation to the three phase sampled current signals to obtain two phase stationary current signals, then multiply by the resistance to obtain corresponding voltage signals across the inductance.

Example 24. The apparatus according to example 23, wherein the estimating module is further configured to:

perform an arctangent operation on two phase rotor flux linkages obtained on the basis of the corresponding voltage signals across the inductance and the two phase stationary voltage signals of the associated voltage signal, to obtain the rotor position angle.

Example 25. An electric machine control system, comprising the apparatus for estimating a rotor position angle according to any one of examples 13-24.

Example 26. A computer-readable storage medium, having stored thereon a program which, when executed by a processor, causes a computer to perform the method according to any one of examples 1-12.

Finally, it must also be explained that the terms "comprise", "include" or any other variants thereof are intended to encompass non-exclusive inclusion, such that a process, method, object or device comprising a series of key elements does not only comprise these key elements but also comprises other key elements not explicitly listed, or also comprises key elements that are intrinsic to such a process, method, object or device. Furthermore, in the absence of further limitation, a key element defined by the phrase "comprises a . . . " does not exclude the presence of another identical key element in the process, method, object or device comprising the key element.

Although embodiments of the present disclosure have been described in detail above with reference to the drawings, it should be clear that the embodiments described above are merely configured to explain the present disclosure, without limiting it. A person skilled in the art could make various modifications and changes to the above embodiments without deviating from the substance and scope of the present disclosure. Thus, the scope of the present disclosure is defined by the attached claims and their equivalents alone.

What is claimed is:

1. A method, comprising:
    obtaining a back emf of a stator of an electric machine;
    performing a second-order generalized integrator (SOGI) operation on the back emf to obtain a first signal with a phase lag of 90 degrees with respect to the back emf;
    dividing the first signal by a resonant frequency of the back emf to obtain a stator flux linkage of the stator;
    subtracting an inductive magnetic flux of the stator from the stator flux linkage to obtain a rotor flux linkage;
    computing a rotor position angle based on the rotor flux linkage; and
    controlling a rotor speed of the electric machine based on the computed rotor position angle via currents provided to windings of the stator.

2. The method according to claim 1, wherein the resonant frequency is equal to a preset electrical angular frequency of the electric machine.

3. The method according to claim 1, wherein the resonant frequency is obtained by inputting a d-axis component of positive sequence components of the first signal into a phase-locked loop circuit.

4. The method according to claim 1, wherein the back emf is a voltage signal of a difference between an associated voltage signal of the stator and a voltage drop across a resistance of the stator, the voltage drop across the resistance being obtained by multiplying a sampled current signal of a winding of the stator by the resistance of the stator.

5. The method according to claim 4, further comprising:
    obtaining an estimated rotor position angle by finding an arctangent of the rotor flux linkage;
    obtaining an estimated electrical angular frequency by finding a derivative of the estimated rotor position angle; and
    computing a q-axis component and a d-axis component of a reference current signal based on the estimated electrical angular frequency and a preset electrical angular frequency of the electric machine.

6. The method according to claim 5, wherein computing the q-axis component and the d-axis component of the reference current signal based on the estimated electrical angular frequency and the preset electrical angular frequency of the electric machine comprises:
    computing a reference torque based on the estimated electrical angular frequency and the preset electrical angular frequency, and
    computing the q-axis component and the d-axis component of the reference current signal based on the reference torque and the estimated electrical angular frequency.

7. The method according to claim 6, further comprising:
    obtaining a q-axis component and a d-axis component of the associated voltage signal based on the q-axis component and the d-axis component of the reference current signal and a q-axis component and a d-axis component of the sampled current signal of the winding of the stator; and applying an inverse Park transformation to the q-axis component and the d-axis component of the associated voltage signal to obtain two phase stationary voltage signals.

8. The method according to claim 7, further comprising: applying a Clarke transformation and a Park transformation successively to three phase sampled current signals of the winding of the stator to obtain a transformed q-axis component and a transformed d-axis component of the three phase sampled current signals.

9. The method according to claim 8, further comprising: applying the Clarke transformation to the three phase sampled current signals to obtain two phase stationary current signals; and multiplying the two phase stationary current signals by the resistance to obtain corresponding voltage signals across an inductance.

10. The method according to claim 9, further comprising: performing an arctangent operation on two phase rotor flux linkages obtained based on the corresponding voltage signals across the inductance and the two phase stationary voltage signals of the associated voltage signal, to obtain the rotor position angle.

11. An apparatus, comprising:
a reference signal generator, configured to generate a reference current signal;
a current regulator, configured to generate an associated voltage signal of a stator based on the reference current signal and a sampled current signal of a winding of the stator; and
an estimator, configured to:
obtain a back emf of the stator of an electric machine,
perform a second-order generalized integrator (SOGI) operation on the back emf to obtain a first signal with a phase lag of 90 degrees with respect to the back emf,
divide the first signal by a resonant frequency of the back emf to obtain a stator flux linkage of the stator,
subtract an inductive magnetic flux of the stator from the stator flux linkage to obtain a rotor flux linkage, and
compute a rotor position angle based on the rotor flux linkage.

12. The apparatus according to claim 11, wherein the resonant frequency is equal to a preset electrical angular frequency of the electric machine.

13. The apparatus according to claim 11, wherein the estimator further comprises a feedback unit configured to input a d-axis component of positive sequence components of a signal obtained by performing a SOGI operation on the back emf into a phase-locked loop circuit in the feedback unit, to obtain the resonant frequency.

14. The apparatus according to claim 11, wherein the back emf is a voltage signal of a difference between the associated voltage signal of the stator and a voltage drop across a resistance of the stator, the voltage drop across the resistance being obtained by multiplying the sampled current signal of the winding of the stator by the resistance of the stator.

15. The apparatus according to claim 14, wherein the reference signal generator further comprises a speed regulator, configured to:
obtain an estimated rotor position by finding an arctangent of the rotor flux linkage, and obtain an estimated electrical angular frequency by finding a derivative of the estimated rotor position, and
compute a reference torque based on the estimated electrical angular frequency and a preset electrical angular frequency; and
a current generator, configured to compute a q-axis component and a d-axis component of the reference current signal based on the reference torque and the estimated electrical angular frequency.

16. The apparatus according to claim 15, wherein the current regulator further comprises:
a torque current regulator, configured to compute a q-axis component of the associated voltage signal based on the q-axis component of the reference current signal and a q-axis component of the sampled current signal of the winding of the stator; and
an excitation current regulator, configured to compute a d-axis component of the associated voltage signal based on the d-axis component of the reference current signal and a d-axis component of the sampled current signal of the winding of the stator.

17. The apparatus according to claim 16, wherein the torque current regulator and the excitation current regulator are configured to perform proportional-integral-derivative control or have a pole-zero configuration.

18. The apparatus according to claim 16, wherein a Clarke transformation and a Park transformation are successively applied to three phase sampled current signals of the winding of the stator to obtain a transformed q-axis component and a transformed d-axis component of the three phase sampled current signals.

19. The apparatus according to claim 18, wherein the estimator is further configured to:
apply an inverse Park transformation to the q-axis component and the d-axis component of the associated voltage signal to obtain two phase stationary voltage signals; and
apply the Clarke transformation to the three phase sampled current signals to obtain two phase stationary current signals, then multiply by the resistance to obtain corresponding voltage signals across an inductance.

20. The apparatus according to claim 19, wherein the estimator is further configured to:
perform an arctangent operation on two phase rotor flux linkages obtained based on the corresponding voltage signals across the inductance and the two phase stationary voltage signals of the associated voltage signal, to obtain the rotor position angle.

21. A non-transitory computer-readable storage medium, having stored thereon a program which, when executed by a processor, enabled enables the processor to perform the following steps:
obtaining a back emf of a stator of an electric machine;
performing a second-order generalized integrator (SOGI) operation on the back emf to obtain a first signal with a phase lag of 90 degrees with respect to the back emf;
dividing the first signal by a resonant frequency of the back emf to obtain a stator flux linkage of the stator;
subtracting an inductive magnetic flux of the stator from the stator flux linkage to obtain a rotor flux linkage;
computing a rotor position angle based on the rotor flux linkage; and
controlling a rotor speed of the electric machine based on the computed rotor position angle via currents provided to windings of the stator.

* * * * *